US009655114B1

(12) United States Patent
Reynolds et al.

(10) Patent No.: US 9,655,114 B1
(45) Date of Patent: May 16, 2017

(54) METHODS AND APPARATUS TO ALLOCATE BANDWIDTH BETWEEN SUBSCRIBERS OF A COMMUNICATIONS NETWORK

(71) Applicant: AT&T Intellectual Property I, L.P., Atlanta, GA (US)

(72) Inventors: Anthony Reynolds, Oak Lawn, IL (US); Kenneth Daleo, St. Louis, MO (US); Darren DeJaeger, Crystal Lake, IL (US); Blaine Fawcett, Greenfield, PA (US); Christopher Huffman, Glen Carbon, IL (US); Keith Peterson, Woodstock, GA (US); Steve Shaffer, Avon, IN (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/955,036

(22) Filed: Nov. 30, 2015

(51) Int. Cl.
*H04W 28/00* (2009.01)
*H04W 72/04* (2009.01)
*H04M 15/00* (2006.01)

(52) U.S. Cl.
CPC ....... *H04W 72/0446* (2013.01); *H04M 15/60* (2013.01)

(58) Field of Classification Search
CPC ..... H04W 28/16; H04W 28/18; H04W 28/20; H04W 28/22; H04W 28/24; H04W 28/26;
(Continued)

(56) References Cited

U.S. PATENT DOCUMENTS

| 5,446,734 A * | 8/1995 | Goldstein ............... H04L 47/10 370/397 |
| 7,650,138 B1 | 1/2010 | Henry, Jr. et al. |

(Continued)

OTHER PUBLICATIONS

Limer, Eric, Zact: This is How Every Wireless Plan Should Work, May 13, 2013, 9 pages, Gizmodo, gizmodo.com.
(Continued)

*Primary Examiner* — Meless Zewdu
(74) *Attorney, Agent, or Firm* — Hanley, Flight & Zimmerman, LLC

(57) ABSTRACT

Methods and apparatus to allocate bandwidth between subscribers of a communications network are disclosed. An example method to allocate bandwidth between subscribers of a communications network includes projecting that a first network data usage of a first subscriber of the network service provider will exceed a first data allotment for a first network access account of the first subscriber within a time period. The example method also includes identifying a second subscriber of the network service provider who is included in a subscriber group with the first subscriber and projected to have a second network data usage that is below a second data allotment for a second account of the second subscriber within that time period. The example method also includes requesting assent from the second subscriber to transfer a portion of the second data allotment to the first subscriber. The example method also includes, in response to receiving the assent from the second subscriber, transferring the portion of the second data allotment from the second account to the first account.

17 Claims, 12 Drawing Sheets

(58) Field of Classification Search
CPC ... H04W 16/14; H04W 72/12; H04W 72/121; H04W 4/24; H04W 4/26; H04W 72/04; H04W 72/0493; H04W 72/1252; H04W 28/00; H04W 8/18; H04W 8/186; H04W 4/08

See application file for complete search history.

(56) References Cited

U.S. PATENT DOCUMENTS

| | | | |
|---|---|---|---|
| 7,761,082 | B2 | 7/2010 | Mongazon-Cazavet et al. |
| 7,792,040 | B2 | 9/2010 | Nair et al. |
| 8,112,549 | B2 * | 2/2012 | Srinivasan ........... G06Q 10/107 709/248 |
| 8,170,056 | B2 | 5/2012 | Allen et al. |
| 8,412,152 | B2 | 4/2013 | Pattabiraman |
| 8,429,007 | B1 | 4/2013 | Sobolevitch et al. |
| 8,577,329 | B2 | 11/2013 | Momtahan et al. |
| 8,594,622 | B2 | 11/2013 | Jerath et al. |
| 8,903,358 | B2 | 12/2014 | Kiene et al. |
| 8,903,974 | B2 | 12/2014 | Rajagopalan et al. |
| 9,077,821 | B2 | 7/2015 | Pallares Lopez et al. |
| 2002/0131375 | A1 * | 9/2002 | Vogel ............... H04B 7/18584 370/322 |
| 2005/0096010 | A1 | 5/2005 | Benco et al. |
| 2008/0195533 | A1 | 8/2008 | Harkins et al. |
| 2008/0301017 | A1 * | 12/2008 | Dawson ............... G06Q 40/00 705/35 |
| 2011/0109472 | A1 * | 5/2011 | Spirakis ............... G06Q 10/06 340/870.02 |
| 2013/0030960 | A1 | 1/2013 | Kashanian |
| 2013/0196626 | A1 | 8/2013 | Zalmanovitch et al. |
| 2014/0024339 | A1 | 1/2014 | Dabbiere et al. |
| 2014/0162595 | A1 | 6/2014 | Raleigh et al. |
| 2014/0179266 | A1 * | 6/2014 | Schultz ................. H04W 4/24 455/406 |
| 2014/0378092 | A1 | 12/2014 | Bedingfield, Sr. et al. |
| 2015/0011179 | A1 | 1/2015 | Won |
| 2015/0050912 | A1 | 2/2015 | Henry, Jr. et al. |
| 2015/0065085 | A1 | 3/2015 | Sheikh Naziruddin et al. |
| 2015/0170230 | A1 | 6/2015 | Panchal et al. |
| 2015/0381826 | A1 * | 12/2015 | Marimuthu ......... H04M 15/886 455/405 |

OTHER PUBLICATIONS

Newman, Jared, Running the Number on AT&T's New Shred Data Plans, Jul. 19, 2013, 4 pages, Time, techland.time.com.

Shein, Esther, Verizon Wireless Reveals 'Share Everything' Plan, Jun. 12, 2012, 10 pages, Information Week, informationweek.com.

Orange. "Top-up mobile phone around the world." retrieved from <https://topup.orange.com> on Nov. 30, 2015 (2 pages).

AT&T, "Family Plans—Mobile Share Data Plans." retrieved from <http://www.att.com/shop/wireless/data-plans.html> on Nov. 30, 2015 (4 pages).

* cited by examiner

METHODS AND APPARATUS TO ALLOCATE BANDWIDTH BETWEEN SUBSCRIBERS OF A COMMUNICATIONS NETWORK

FIELD OF THE DISCLOSURE

This disclosure relates generally to communications networks, and, more particularly, to methods and apparatus to allocate bandwidth between subscribers of a communications network.

BACKGROUND

Communications network providers offer defined data allocations to subscribers in exchange for payment. Such data allocations may be in the form of pre-paid data allocations and/or post-paid data allocations. In some cases, data allocations define the limits on access to the communications network by the subscriber's communications devices and/or bandwidth provided to the communications devices.

SUMMARY

Methods and apparatus to allocate bandwidth between subscribers of a communications network are disclosed. Some example methods to allocate bandwidth between subscribers of a communications network include projecting that a first network data usage of a first subscriber of the network service provider will exceed a first data allotment for a first network access account of the first subscriber within a time period. Some example methods further include identifying a second subscriber of the network service provider who is included in a subscriber group with the first subscriber and projected to have a second network data usage that is below a second data allotment for a second account of the second subscriber within that time period. In some such examples, the second subscriber has a different billing address than the first subscriber. Some example methods further include requesting assent from the second subscriber to transfer a portion of the second data allotment to the first subscriber. Some examples further include, in response to receiving the assent from the second subscriber, transferring the portion of the second data allotment from the second account to the first account.

Disclosed example network service provider apparatus to allocate bandwidth between subscribers of the network service provider include a processor and a memory. In some examples, the memory stores machine readable instructions which, when executed by the processor, cause the processor to perform operations. In some examples, the operations include projecting that a first network data usage of a first subscriber of the network service provider will exceed a first data allotment for a first network access account of the first subscriber within a time period. In some examples, the operations also include identifying a second subscriber of the network service provider who is included in a subscriber group with the first subscriber and projected to have a second network data usage that is below a second data allotment for a second account of the second subscriber within that time period. In some examples, the second subscriber has a different billing address than the first subscriber. In some examples, the operations include requesting assent from the second subscriber to transfer a portion of the second data allotment to the first subscriber. In some examples, the operations include, in response to receiving the assent from the second subscriber, transferring the portion of the second data allotment from the second account to the first account.

BRIEF DESCRIPTION OF THE DRAWINGS

The figures are not to scale. Wherever appropriate, the same reference numbers will be used throughout the drawing(s) and accompanying written description to refer to the same or like parts.

DETAILED DESCRIPTION

Figure 1:
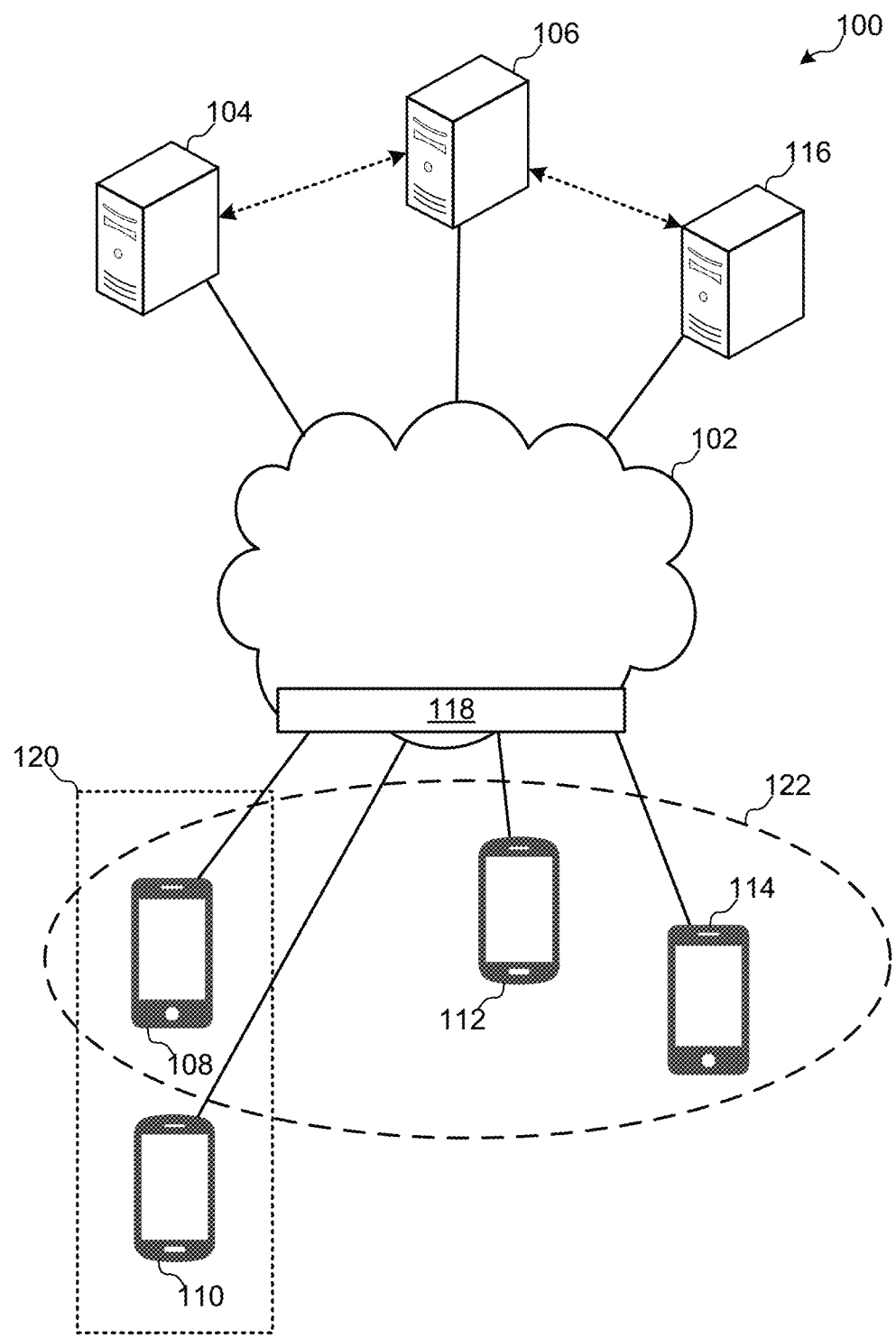
FIG. 1 illustrates an example system constructed in accordance with the teachings of this disclosure to allocate bandwidth between subscribers of a communications network.

Disclosed examples permit subscribers of a communications network to transfer and/or exchange bandwidth allocations between themselves. In contrast with known solutions in which each subscriber must interact solely with the communications provider, disclosed examples permit subscribers to provide data allocation and/or bandwidth assistance to one another.

Disclosed examples permit the creation of subscriber groups that span different subscriber accounts. Communications network providers typically differentiate subscribers by, for example, account number and billing address. Within an account number and/or billing address, there may be multiple devices and/or individuals drawing on a defined data allocation. Disclosed examples enable subscribers to span different subscriber accounts to create pools of subscribers. Disclosed examples facilitate requests and/or transfers between different subscribers within the pool to allocate bandwidth between such subscribers.

Disclosed examples apply transfers of data allocations and/or bandwidth between subscribers in real time and make such transfers effective immediately, so as to avoid disruption to the subscriber caused by delays in the effects.

As an example, if John (a first subscriber) is about to exceed his data allotment, disclosed examples permit Jane (a second subscriber) to pre-define that she will donate all or a portion of her data allotment to John. In some other examples, Jane may get an alert on one or more of her devices (e.g., in real-time) asking Jane to agree to transfer all or a portion of her allotment to John. In some examples, if John is about to exceed his data allotment, John receives an alert asking if he would like to request Jane, Fred (a third subscriber), Barney (a fourth subscriber), or Betty (a fifth subscriber) to donate some or all of their respective data allotments to John, where John, Jane, Fred, Barney, and Betty belong to a subscriber group or data allotment transfer pool.

In some examples, transfers of data allotments are done as borrowing or loan transaction, in which the data allotment that John receives from Jane is recorded so that John can return the data allotment to Jane during one or more subsequent billing cycles (e.g., all at once, over time, and/or on demand by Jane). In some examples, before Jane agrees to transfer her data allotment to John, Jane receives an indication of whether the proposed transfer could cause Jane to exceed her data allotment.

In some example communication networks, available data allotment is required by the communications network provider for provision of bandwidth to a subscriber's device(s). After exhaustion of the data allotment, a subscriber may be denied or restricted bandwidth within the communications network. By allocating data allotments and/or bandwidth between subscribers, disclosed examples promote efficient use of communications networks by subscribers. For example, enforcing strict subscriber separation for the purposes of data allocations may force a wireless communications subscriber who has exhausted his or her data allocation to wait for a new data allocation and/or use a substitute network access method that suffers from capacity and/or network congestion issues, even when there is spare capacity and/or bandwidth in the wireless communications network that could be used by the subscriber. In contrast, disclosed examples permit subscribers to continue using the wireless communications networks, thereby reducing excess capacity in the wireless communications networks and reducing congestion in alternative networks.

FIG. 1 illustrates an example system 100 to allocate bandwidth between subscribers of a communications network 102. The example system 100 of FIG. 1 includes a data allocation management server 104 and a subscriber information server 106.

The example data allocation management server 104 allocates bandwidth between subscribers of a communications network 102 by transferring data allocations between accounts of subscribers. In the example of FIG. 1, the subscribers access the communications network 102 via communications devices 108, 110, 112, and 114. The example communications devices 108-114 may be wireless communications devices, such as smartphones, tablet computers, personal wireless hotspots, personal computers having a wireless network access card, and/or any other type of device.

Each of the example communications devices 108-114 of FIG. 1 is associated with a respective data allotment. In some examples, one or more of the communications devices 108-114 subscribes using a postpaid or contract-type account, in which the subscriber is billed according to a contract. The contract may specify a recurring or non-recurring time period, an upper limit on data usage by the device(s) subject to the contract within the time period, and a corresponding price per time period. For example, the communication device 110 is subject to a 2 gigabit (GB) data allotment that resets monthly, for a price of X dollars per month.

In some examples, one or more of the devices 108-114 subscribes using a prepaid account, in which the subscriber of the device purchases a data allotment and associates it with the device. The data allotment may or may not expire after a specific time period, and the subscriber may or may not be permitted to reset the time period by purchasing (or topping up) the data allotment associated with the device. For example, the device 114 is associated with a 1 GB data allotment that expires when the data allotment is used or when a 60 day period from activation of the data allotment has occurred.

The example subscriber information server 106 monitors the data usage of subscribers of the communications network 102. For example, when the communications device 108 accesses the network 102, the subscriber information server 106 receives usage information indicating the data transferred between the device 108 and the network 102. The subscriber information server 106 tracks the data usage by the devices 108-114 by deducting the amounts of transferred data from the corresponding subscriber account. When data usage by the device(s) corresponding to a subscriber account exceeds the data allotment of that subscriber account, the example subscriber information server 106 may message a billing server 116 to charge the subscriber account, or may configure an edge router 118 or other network devices of the communications network 102 to cut off access to the device(s) associated with that account.

A subscriber account may have one or more devices that are subject to a data allotment. For example, the devices 108, 110 are associated with a same account 120 and share the data allotment of the account 120. In addition to having multiple devices on the same account 120, the example system 100 creates, monitors, and manages data sharing groups via the data allocation management server 104. For example, a user of the device 108 may define a data sharing group (e.g., a subscriber group 122) to include the users of the devices 112, 114, who are associated with different subscriber accounts than the account 120 to which the device 108 is associated. The example data allocation management server 104

In some examples, to control the allocation of bandwidth between subscribers of the communications network 102, the example data allocation management server 104 of FIG. 1 projects that a first network data usage of a first subscriber of the communications network 102 (e.g., a user of the device 108) will exceed a data allotment for the network access account of the first subscriber within a time period. Based on the projection, the example data allocation management server 104 identifies a second subscriber (e.g., a user of the device 112) of the communications network 102 who is included in a data sharing group (e.g., the subscriber group 122) with the first subscriber. The data allocation management server 104 also identifies the second subscriber based on projecting the second subscriber to have a second network data usage that is below a second data allotment for the second subscriber's account within the same time period as the first subscriber is projected to exceed the first subscriber's data allotment. The example data allocation management server 104 requests assent from the second subscriber to transfer a portion of the second subscriber's data allotment to the first subscriber. In response to receiving the assent from the second subscriber, the example data allocation management server 104 transfers the portion of the second subscriber's data allotment from the second subscriber's account to the first subscriber's account. By transferring the portion of the second subscriber's data allotment to the first subscriber, the example data allocation management server 104 allocates communication network bandwidth from the first subscriber to the second subscriber.

While the example system 100 of FIG. 1 is described with reference to mobile devices, some wired communications network providers have transitioned toward applying structured data allocations to some or all of their wired communications network subscribers. The example system 100 may additionally or alternatively allocate bandwidth between non-mobile subscribers (e.g., subscribers of fiber and/or wired networks) and/or between non-mobile and mobile subscribers.

Figure 2:
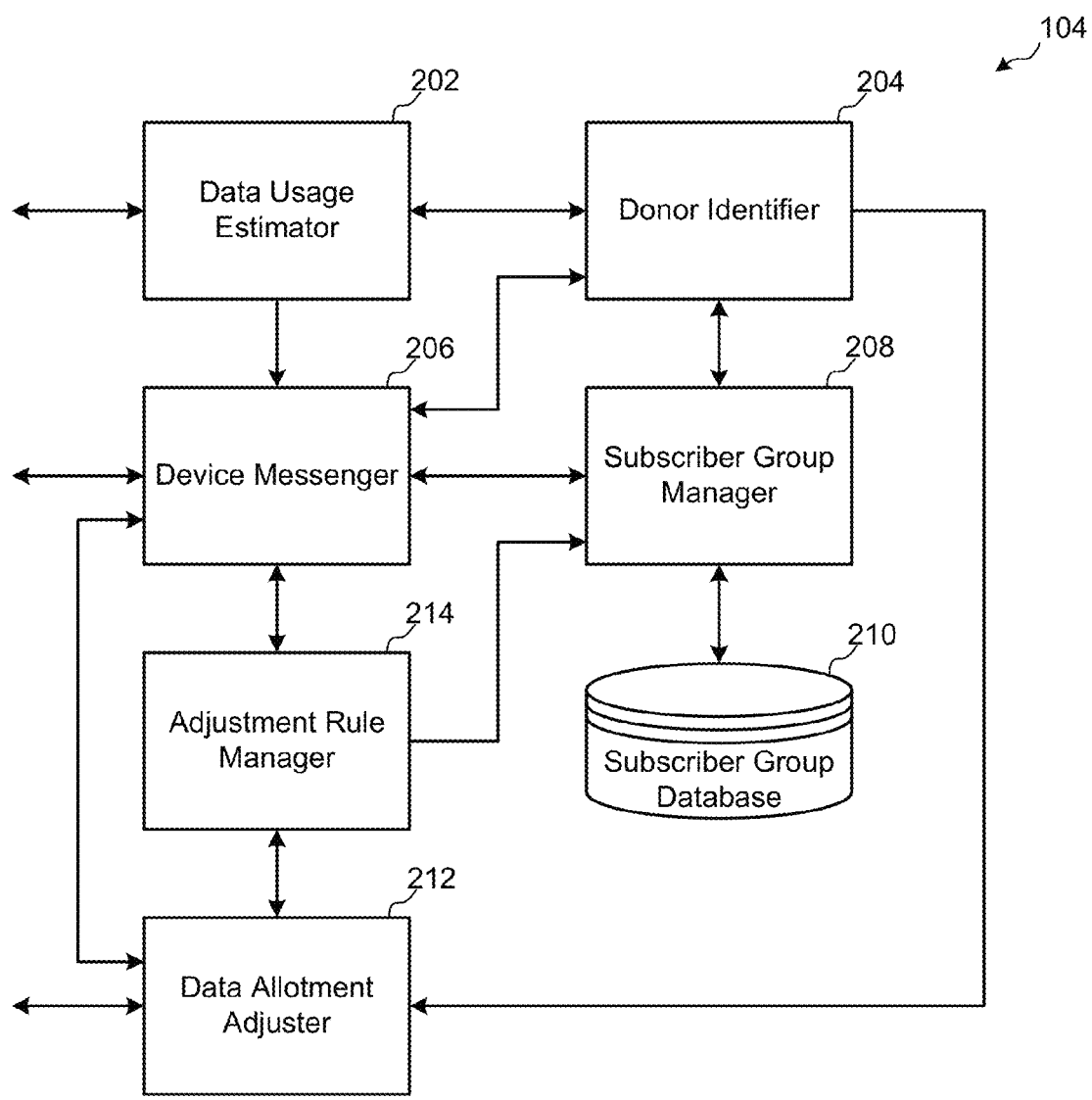
FIG. 2 is a block diagram of an example implementation of the data allocation management server of FIG. 1.

FIG. 2 is a block diagram of an example implementation of the data allocation management server 104 of FIG. 1. The example data allocation management server 104 of FIG. 2 includes a data usage estimator 202, a donor identifier 204, a device messenger 206, a subscriber group manager 208, a subscriber group database 210, a data allotment adjuster 212, and an adjustment rule manager 214.

The example data usage estimator 202 of FIG. 2 projects or estimates the data usage of a subscriber account and, in some examples, compares the projected data usage to the data allotment of the subscriber account. For example, the data usage estimator 202 may repeatedly project the subscriber's data usage during a time period (e.g., during a billing cycle) to project whether the subscriber's data usage will exceed a threshold within the time period. The threshold may be the subscriber's data allotment and/or some percentage of the subscriber's data allotment.

The example data usage estimator 202 may use any prediction method and/or combination of methods to project the network data usage of a subscriber. For example, the data usage estimator 202 may project network data usage based on prior usage patterns by the subscriber and based on extrapolation of the network data usage within the current time period to the remainder of the time period (e.g., linear and/or non-linear).

In some examples, if the data usage estimator 202 estimates that the subscriber will go over the subscriber's data plan limit, the example data usage estimator 202 triggers notifications to that subscriber. Additionally or alternatively, the data usage estimator 202 may trigger notifications to other subscribers in the subscriber's subscriber group (e.g., to prompt the other subscribers to donate portions of their data allotments).

The example donor identifier 204 of FIG. 2 identifies one or more subscribers of the communications network 102 who can donate portions of data allotments to a subscriber identified by the data usage estimator 202 as projected to exceed the subscriber's data allotment. For example, in response to the data usage estimator 202 projecting that a first subscriber will exceed the first subscriber's data allotment during a time period, the example donor identifier 204 identifies a second subscriber who a) is included in a subscriber group with the first subscriber and b) is projected to have a network data usage that is below a second data allotment for the account of the second subscriber within that same time period. In this example, the second subscriber is identified as having a different billing address than the first subscriber.

The example device messenger 206 of FIG. 2 sends and receives messages (e.g., requests and/or responses) to communications devices such as the devices 108-114 of FIG. 1. The messages are sent and/or received at the direction of the data usage estimator 202, the donor identifier 204, the subscriber group manager 208, the data allotment adjuster 212, and/or the adjustment rule manager 214.

For example, when the donor identifier 204 identifies the second subscriber as a possible donor to the first subscriber of the above example, the device messenger 206 requests assent from the second subscriber to transfer a portion of the second data allotment to the first subscriber by sending a request for assent to a device of the second subscriber. For example, the example device messenger 206 may sending a first message to a device of the first subscriber, where the message causes the device to indicate that the first network data usage of the first subscriber is projected to exceed the first data allotment. The device may also permit the first subscriber to identify the second subscriber and indicate that a data allotment transfer is desired. Alternatively, the message to the first subscriber's device identifies the second subscriber as a potential candidate to donate a data allotment.

In response to receiving a second message from the first subscriber's device that identifies the second subscriber and indicates that the data allotment transfer is desired, the device messenger 206 requests the assent from the second subscriber.

The example subscriber group manager 208 of FIG. 2 manages subscriber groups for the subscribers of the communications network 102. The subscriber group manager 208 stores and retrieves the subscriber groups from the subscriber group database 210. In some examples, each subscriber has his or her own defined subscriber group stored in the subscriber group database 210.

The example subscriber group manager 208 may add the second subscriber to the first subscriber's subscriber group by receiving a request from at least one of the first subscriber and the second subscriber to have the second subscriber included in the subscriber group, and storing a subscriber identifier of the second subscriber in association with the first subscriber in the subscriber group. In some examples, the subscriber group manager 208 requests assent from the non-requesting party (e.g., the second subscriber if the subscriber requested the addition) before adding the subscriber to the subscriber group.

The example data allotment adjuster 212 of FIG. 2 executes transfers of data allotments between the accounts of assenting subscribers, keeps records of the transfers, and/or notifies the billing server 116 to adjust a subscriber's bill. For example, the data allotment adjuster 212 transfers a portion of a data allotment of a second subscriber to the account of a first subscriber in response to receiving assent to the transfer from the second subscriber and, in some examples, from the first subscriber. The example data allotment adjuster 212 may receive the assent by sending a message to a device of the second subscriber, the message including an identification of the first subscriber and receiving a response indicating assent. Additionally or alternatively, the data allotment adjuster 212 may determine assent by the second subscriber based on comparing the portion of the second data allotment to an assent rule set by the second subscriber.

The example adjustment rule manager 214 of FIG. 2 permits the subscribers of the communications network 102 to set rules regarding transfers of data allotments to and/or from the subscribers' accounts, rules regarding notifications, and/or other rules regarding management of data allotments. Example rules that may be set by the adjustment rule manager 214 include subscriber-defined rules to identify who in the group has data to share, subscriber-defined rules to automatically add data to another user in the group when they need data, subscriber-defined rules to "borrow" data in a first time period and pay it back in one or more subsequent time periods, system-defined rules as to which subscribers are permitted to participate in the program (e.g., subscribers who do not have an unlimited data plan having an unlimited data allotment), and/or system rules as to how many data allotment transactions can occur within one billing cycle for a given subscriber account.

For example, the adjustment rule manager 214 may receive messages from the device 108 of FIG. 1 (e.g., via the device messenger 206) to set, change, and/or delete rules. Example rules include pre-approving assent to data transfers that fall within defined parameters, such as: specific subscribers to whom the transfer is approved, specific data allotment portion sizes to transfer, threshold data allotments remaining after a proposed transfer, and/or a number of days remaining in the current time period. However, other parameters may additionally or alternatively be set. In some examples, a subscriber may automatically reject data allotment requests falling outside of the parameters, automatically reject all data allotment requests, automatically reject requests to be added to a subscriber pool, and/or disable notifications originating from the data allocation management server 104 from being sent to the device(s) of the subscriber.

In some examples, the subscriber group manager 208 stores an identification of the transfer in association with the first subscriber and the second subscriber. For example, the identification of the transfer may reflect a data allotment loaning arrangement, in which the first subscriber has a debt of the same data allotment to be paid back to the data allotment of the second subscriber's account in a subsequent time period (e.g., the next billing cycle, or on demand by the second subscriber). At a second time after the time period, the example data allotment adjuster 212 may identify assent by the first subscriber to a transfer to the second subscriber by querying the subscriber group manager 208 and/or the subscriber group database 210 for information identifying the loan data allotment transaction. In response to identifying the loan-type transaction, the example data allotment adjuster 212 transfers the third data allotment from the first account to the second account. The third data allotment is based on (e.g., equal to) the portion of the second data allotment that was transferred from the second subscriber to the first subscriber in the loan-type transaction.

The example user interface screens of FIGS. 3-14 are described below with reference to the communications device 108 (e.g., belonging to "Subscriber 0"). and the communications device 110 (e.g., belonging to "Subscriber 1"). The example user interface screens may be accessed by a user by interacting with the devices 108, 110 after authenticating as an authorized user of their respective subscriber accounts (e.g., users authorized to donate and/or receive data allotments).

Figure 3:
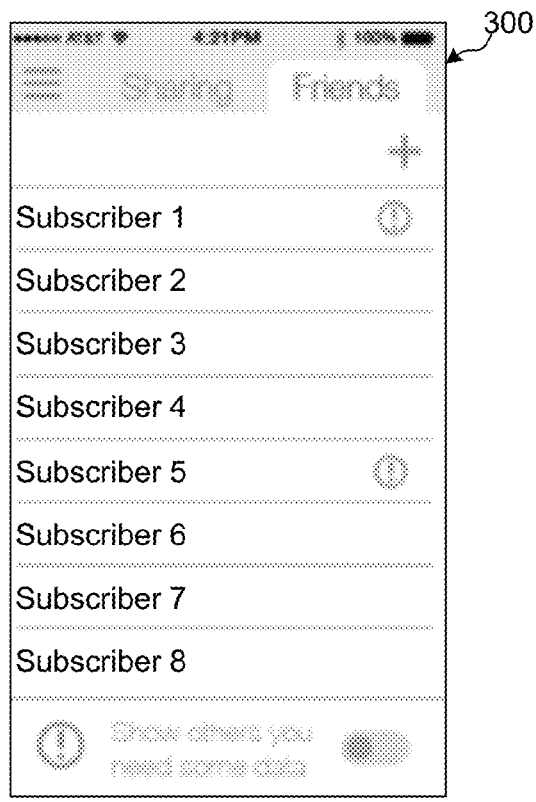
FIGS. 3-14 illustrate example user interfaces that may be presented to users via the example network communication devices of FIG. 1 to, in cooperation with the data allocation management server of FIGS. 1 and/or 2, allocate bandwidth between subscribers of the communications network of FIG. 1.

FIG. 3 is an example user interface screen 300 that may be presented on one of the devices 108-114 of FIG. 1 to configure a subscriber group that includes different subscriber accounts. The user interface screen 300 shows a set of subscribers who have agreed to be included in a subscriber group with Subscriber 0. One or more of the subscribers identified on the user interface screen 300 may be selected to request a data allotment from the selected subscriber or to offer to donate a data allotment to the selected subscriber.

Figure 4:
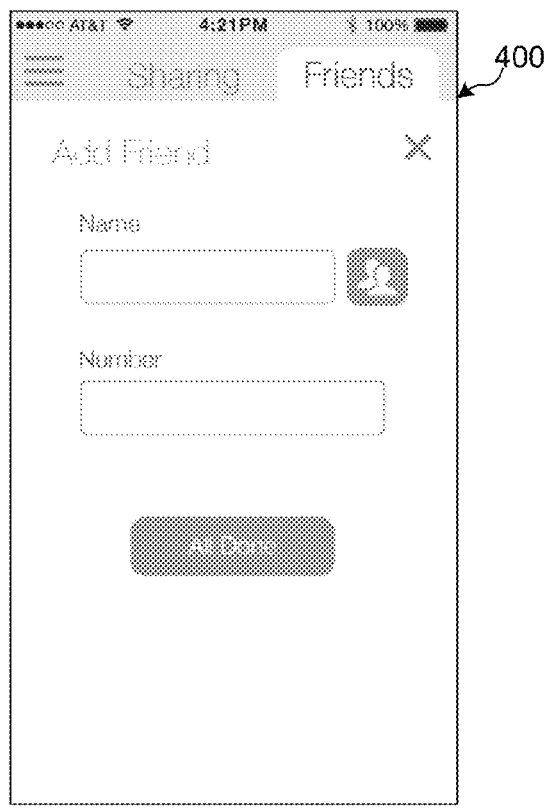

FIG. 4 is an example user interface screen 400 that may be presented on one of the devices 108 to identify a subscriber for adding to the subscriber group of Subscriber 0. For example, a subscriber may be identified by a name and/or a phone number, and/or the identification information may be selected from a contacts database of the device.

After identification and confirmation of another subscriber via the user interface screen 400, the example device 108 transmits a message to the data allocation management server 104 of FIGS. 1 and/or 2. The device messenger 206 receives the message and forwards the message to the subscriber group manager 208. The example subscriber group manager 208 generates a new message to the identified subscriber requesting permission to add the identified subscriber to the subscriber group with the requesting Subscriber 0. If the identified subscriber assents to be added, the example device messenger 206 receives the assent message and the subscriber group manager 208 adds the assenting subscriber to the subscriber group of the Subscriber 0.

Figure 5:
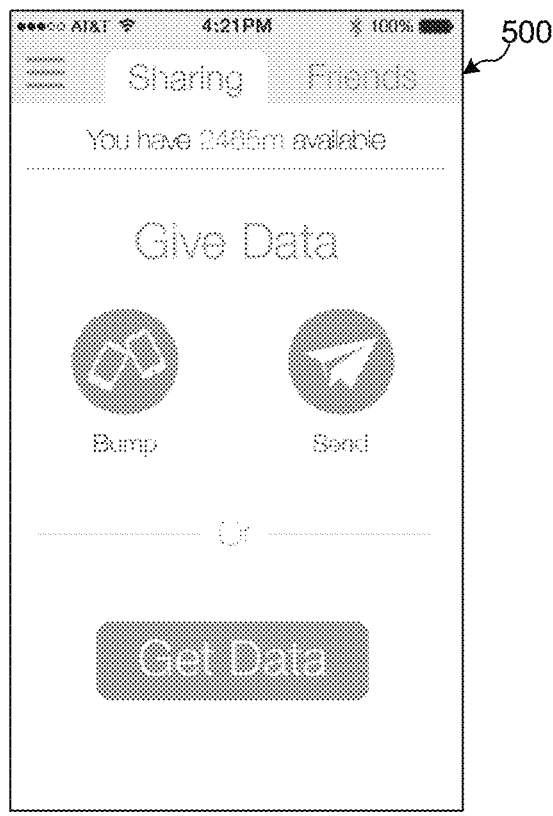

FIG. 5 is an example user interface screen 500 that may be presented on the example device 108 of FIG. 1 to enable a user to select to transfer a data allotment to another subscriber (e.g., "Send Data") and/or to request another subscriber in a subscriber group for a data allotment (e.g., "Get Data").

Figure 6:
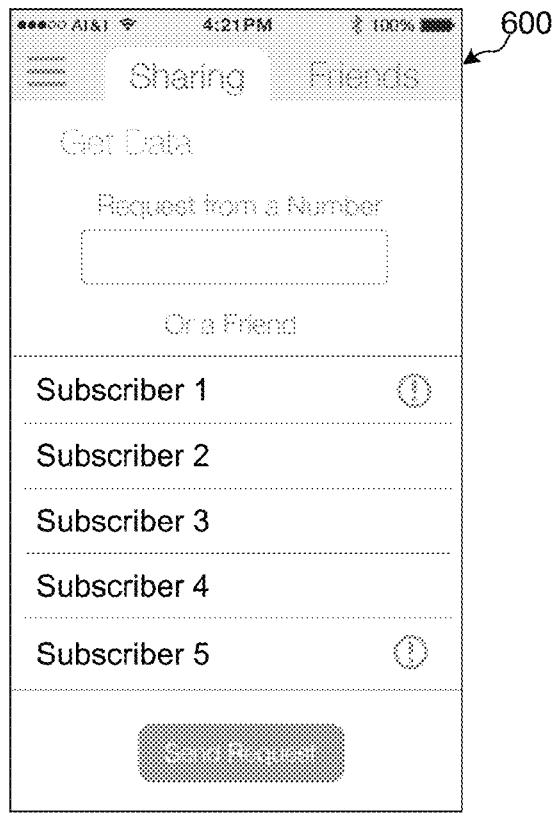

FIG. 6 is an example user interface screen 600 that may be presented on the example device 108 of FIG. 1. The example user interface screen 600 is presented in response to selecting to request data from another subscriber in the user interface screen 500 of FIG. 5. As shown in FIG. 6, the example user interface screen 600 enables selection of another person from the subscriber group of Subscriber 0 and/or entry of a phone number or other identifier of someone who is not in the subscriber group.

Figure 7:

FIG. 7 is an example user interface screen 700 that may be presented on the example device 110 of FIG. 1. The example user interface screen 700 may be presented in response to receiving, from the device messenger 206 of FIG. 2, a request for assent to transfer a data allotment to Subscriber 0. The example user interface screen 700 enables the user of the device 110 (e.g., Subscriber 1, after authentication as a user who is authorized to transfer data allotments for the subscriber account) to assent to or reject the request.

Figure 8:
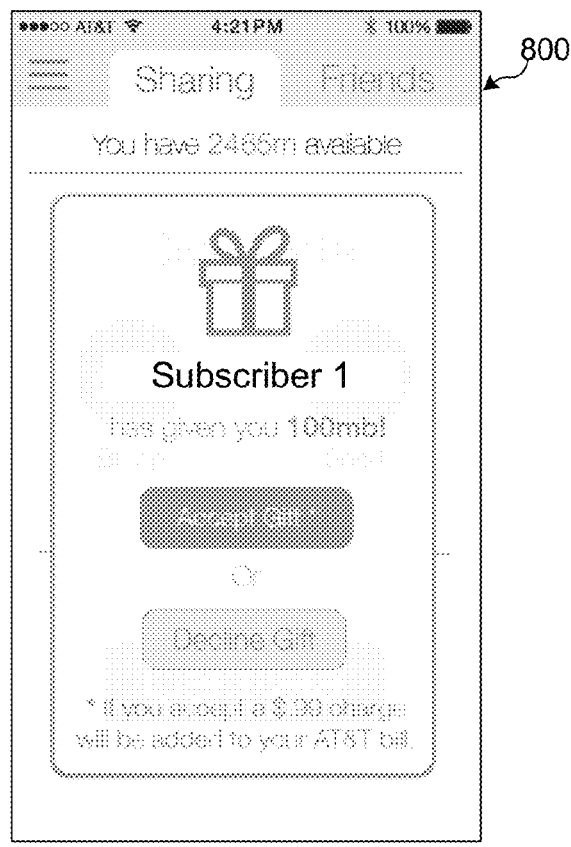

FIG. 8 is an example user interface screen 800 that may be presented on the example device 108 of FIG. 1 after the user of the device 110 assents to transferring the requested data allotment. The example user interface screen 800 identifies the subscriber (e.g., Subscriber 1) that is donating a data allotment to Subscriber 0, and requests permission to confirm the transfer. If Subscriber 0 permits the transfer (e.g., "Accept Gift"), the example data allocation management server 104 completes the transfer (e.g., via the data allotment adjuster 212 of FIG. 2). In some examples, the and the data allocation management server 104 notifies the billing server 116 to add a transfer charge to the accounts of Subscriber 0, Subscriber 1, or both. In some other examples, the data allocation management server 104 does not charge for the transfer. On the other hand, if Subscriber 0 rejects the transfer (e.g., "Decline Gift"), the example data allocation management server 104 cancels the transfer of the data allotment.

Figure 9:
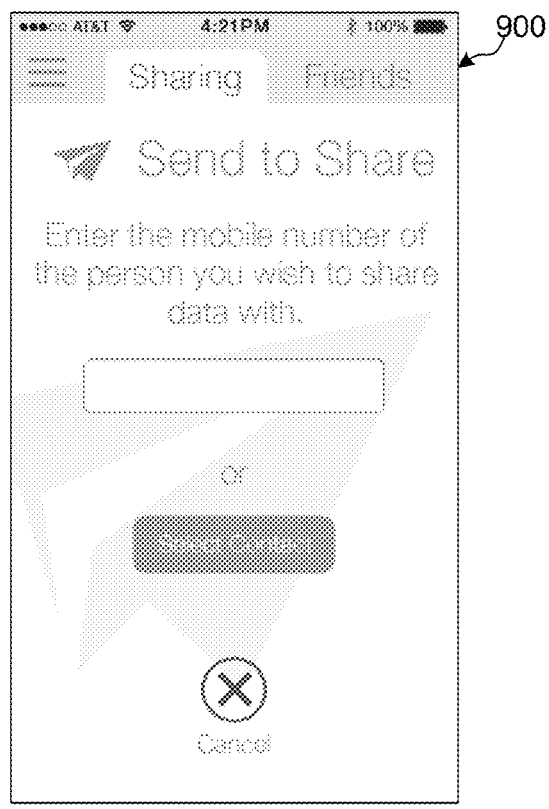

FIG. 9 is an example user interface screen 900 that may be presented on the example device 110 of FIG. 1 in response to selecting to transfer a data allotment to another subscriber (e.g., "Send Data") via the user interface screen 500 of FIG. 5. The example user interface screen 900 prompts a user to identify a subscriber (e.g., Subscriber 0) to whose subscriber account the data allotment is to be transferred and/or to select from the subscriber group of the Subscriber 1.

Figure 10:
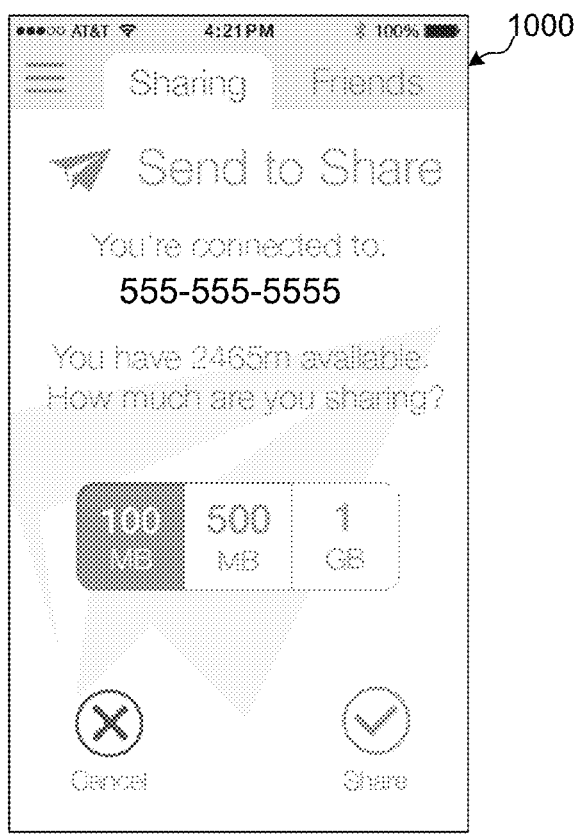

FIG. 10 is an example user interface screen 1000 that may be presented on the example device 110 of FIG. 1. The example device 110 may display the user interface screen 1000 in response to receiving an input an identifier associated with a subscriber (e.g., Subscriber 0) to whom the user of the user interface screen 1000 is to transfer a data allotment.

Figure 11:
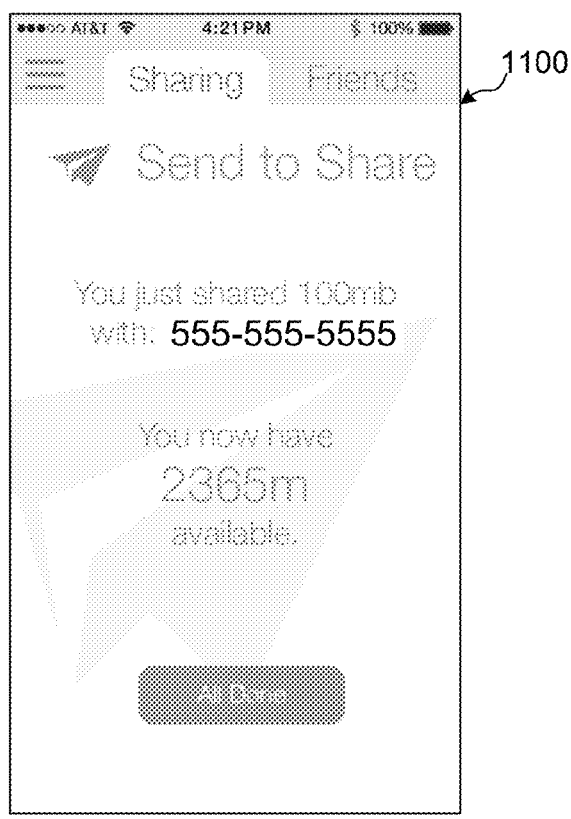

FIG. 11 is an example user interface screen 1100 that may be presented on the example device 110 of FIG. 1. The example device 110 may display the user interface screen 1100 to confirm a transfer of a portion of a data allotment of the Subscriber 1 by the data allocation management server 104 after the selection of the portion and assent to the transfer via the user interface screen 1000 of FIG. 10.

Figure 12:
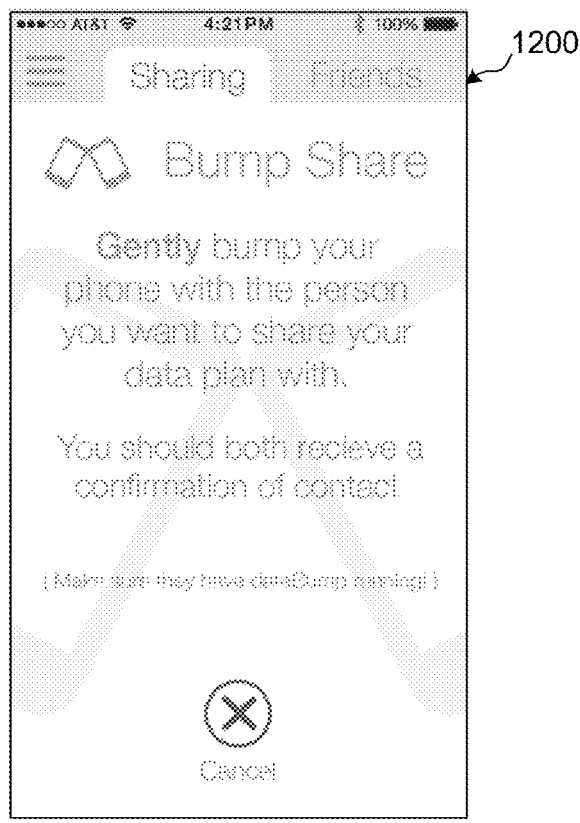

FIG. 12 is an example user interface screen 1200 that may be presented on the example device 110 of FIG. 1 in response to selecting to transfer a data allotment to another subscriber whose device (e.g., the device 108) is physically present near the device 110 (e.g., "Bump") via the user interface screen 500 of FIG. 5. The example user interface screen 1200 prompts the user of the device 110 to make physical contact (e.g., physically bump) the devices 108, 110 together, to cause the accelerometers of the devices 108, 110 to trigger a recognition procedure. The recognition procedure may occur via a close proximity communications protocol such as Bluetooth®, but any proximity-based recognition procedure may be used.

Figure 13:
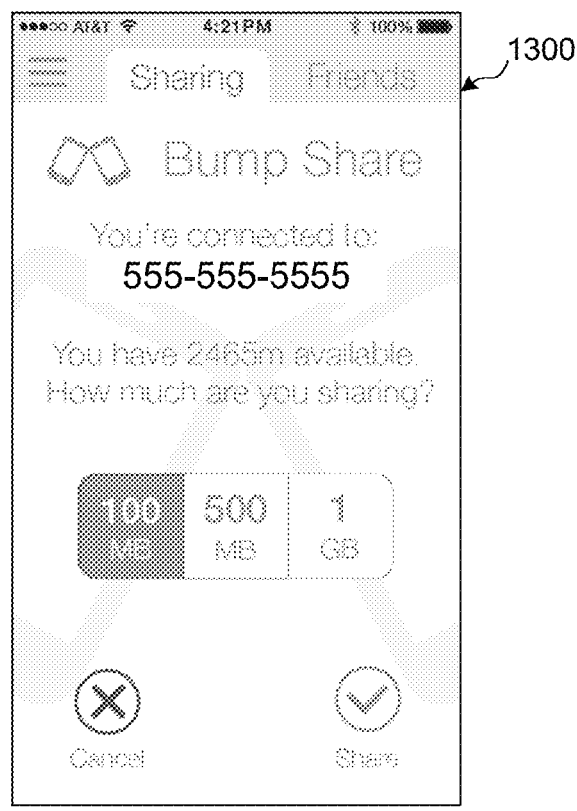

FIG. 13 is an example user interface screen 1300 that may be displayed by the example device 110 of FIG. 1 in response to the devices 108, 110 recognizing each other after the physical contact and a close proximity communications recognition and/or negotiation procedure. The example user interface screen 1300 displays an identification associated with a subscriber to whom a selected portion of the data allotment is to be transferred by the data allocation management server 104 and enables the user to select the size of the portion of the data allotment.

Figure 14:
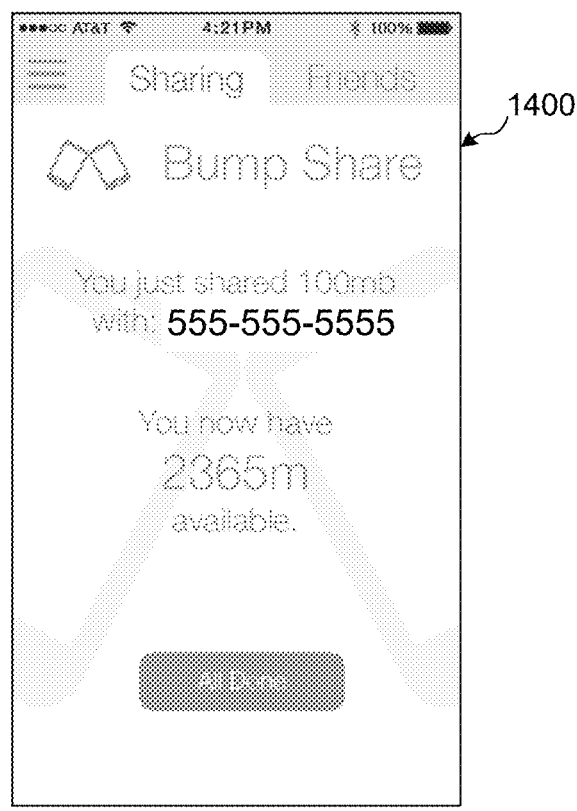

FIG. 14 is an example user interface screen 1400 that may be displayed by the example device 110 of FIG. 1. The example user interface screen 1400 may be displayed by the example device 110 in response to completion of the data allotment transfer to the selected user (e.g., in response to assent to the transfer selected via the user interface 1300 of FIG. 13). The example user interface screen 1400 shows the portion of the data allotment that was transferred and the remaining portion of the data allotment that is reserved to the donor Subscriber 1.

While an example manner of implementing the data allocation management server 104 of FIG. 1 is illustrated in FIG. 2, one or more of the elements, processes and/or devices illustrated in FIG. 2 may be combined, divided, re-arranged, omitted, eliminated and/or implemented in any other way. Further, the example data usage estimator 202, the example donor identifier 204, the example device messenger 206, the example subscriber group manager 208, the example subscriber group database 210, the example data allotment adjuster 212, the example adjustment rule manager 214 and/or, more generally, the example data allocation management server 104 of FIGS. 1 and/or 2 may be implemented by hardware, software, firmware and/or any combination of hardware, software and/or firmware. Thus, for example, any of the example data usage estimator 202, the example donor identifier 204, the example device messenger 206, the example subscriber group manager 208, the example subscriber group database 210, the example data allotment adjuster 212, the example adjustment rule manager 214 and/or, more generally, the example data allocation management server 104 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data usage estimator 202, the example donor identifier 204, the example device messenger 206, the example subscriber group manager 208, the example subscriber group database 210, the example data allotment adjuster 212, and/or the example adjustment rule manager 214 is/are hereby expressly defined to include a tangible computer readable storage device or storage disk such as a memory, a digital versatile disk (DVD), a compact disk (CD), a Blu-ray disk, etc. storing the software and/or firmware. Further still, the example data allocation management server 104 of FIGS. 1 and/or 2 may include one or more elements, processes and/or devices in addition to, or instead of, those illustrated in FIG. 2, and/or may include more than one of any or all of the illustrated elements, processes and devices.

Figure 15:
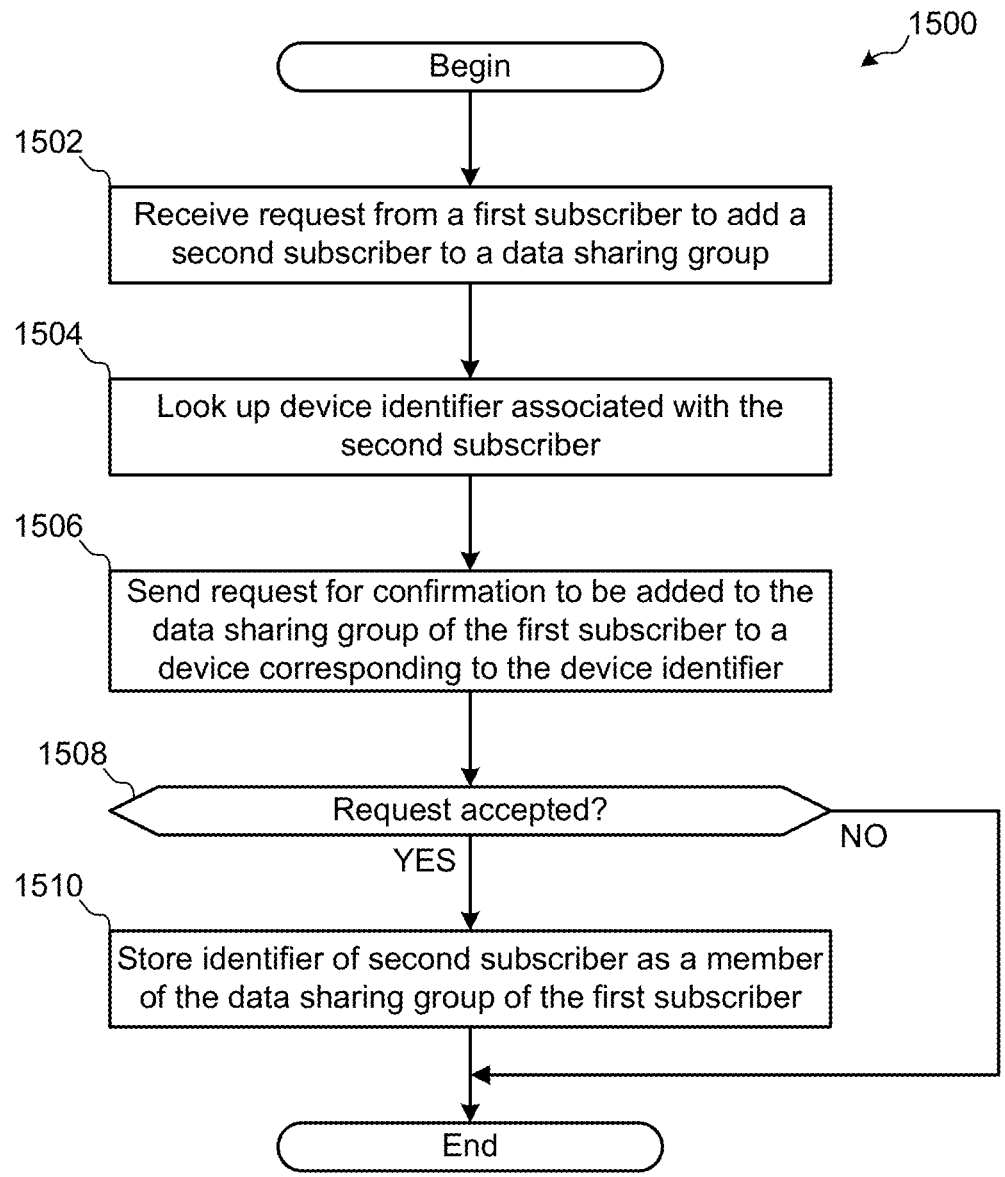
FIG. 15 is a flowchart representative of example instructions that may be executed to allocate bandwidth between subscribers of a communications network.
Figure 16A:
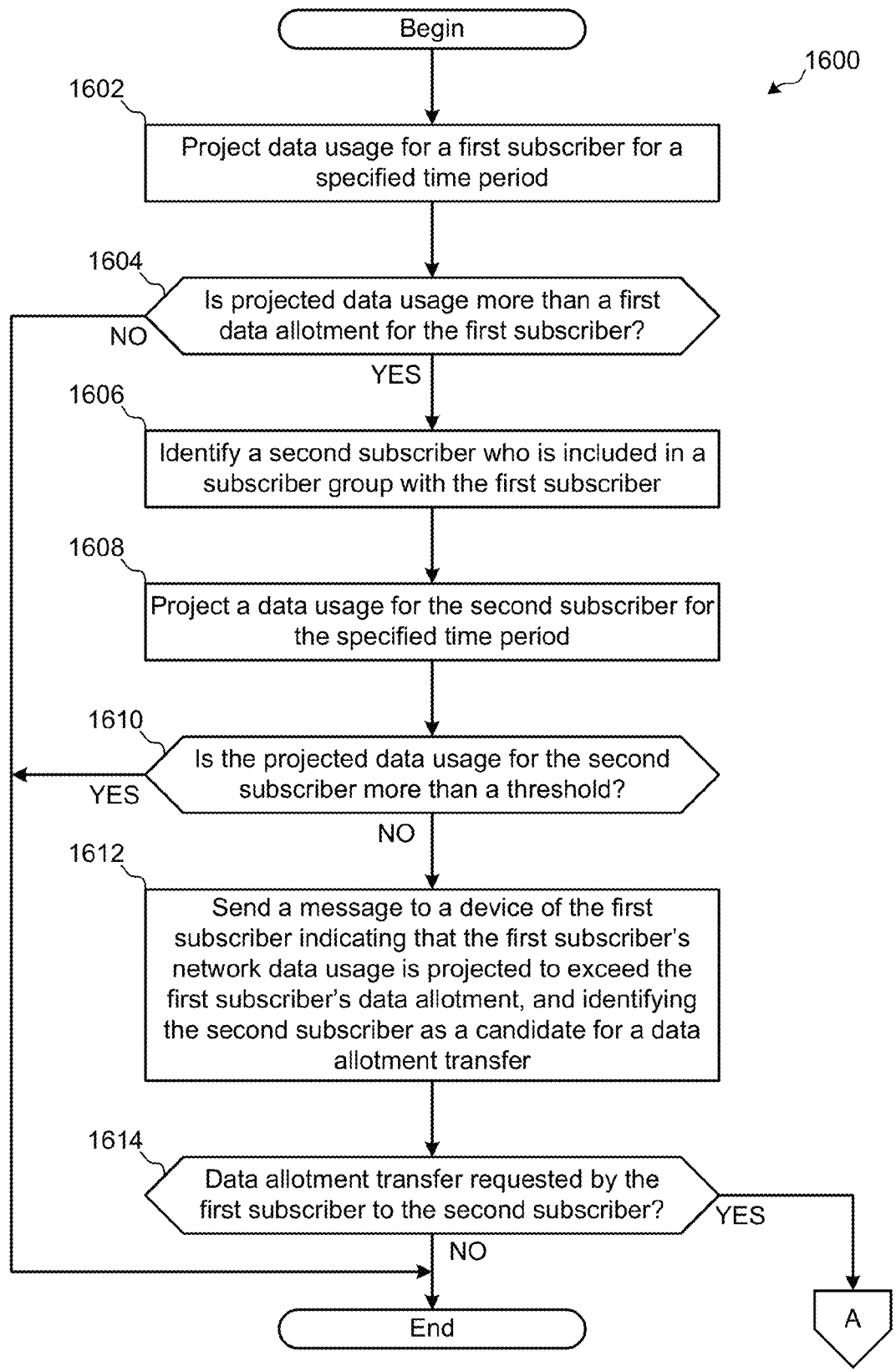
FIGS. 16A and 16B are a flowchart representative of example machine readable instructions that may be executed to implement the example data allocation management server of FIGS. 1 and/or 2 to allocate bandwidth in the communications network of FIG. 1.
Figure 16B:
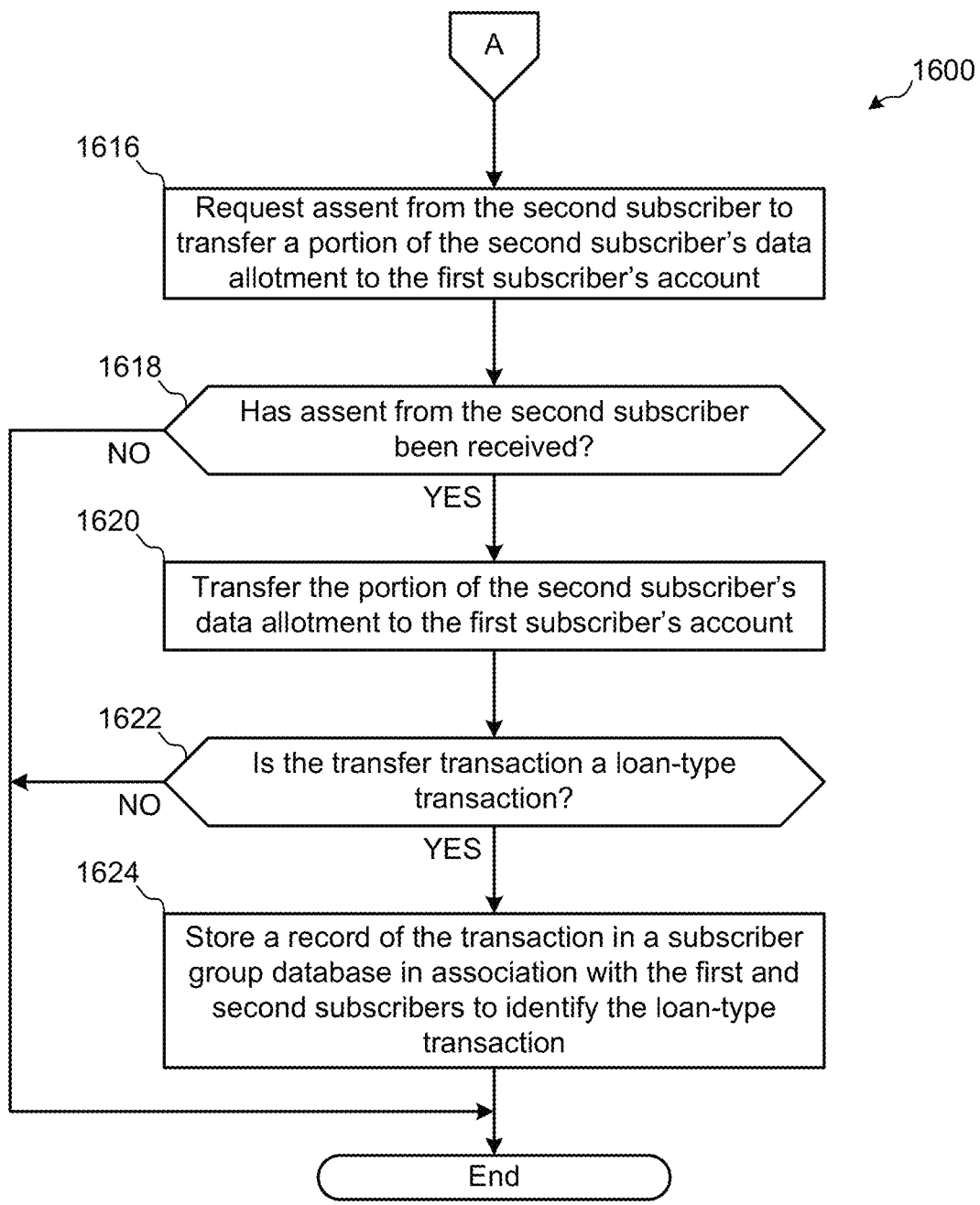

Flowcharts representative of example machine readable instructions for implementing the data allocation management server 104 of FIGS. 1 and/or 2 are shown in FIGS. 15 and 16A-16B. In these examples, the machine readable instructions comprise program(s) for execution by a processor such as the processor 1712 shown in the example processor platform 1700 discussed below in connection with FIG. 17. The program(s) may be embodied in software stored on a tangible computer readable storage medium such as a CD-ROM, a floppy disk, a hard drive, a digital versatile disk (DVD), a Blu-ray disk, or a memory associated with the processor 1712, but the entire program(s) and/or parts thereof could alternatively be executed by a device other than the processor 1712 and/or embodied in firmware or dedicated hardware. Further, although the example program(s) are described with reference to the flowchart illustrated in FIGS. 15 and 16A-16B, many other methods of implementing the example data allocation management server 104 may alternatively be used. For example, the order of execution of the blocks may be changed, and/or some of the blocks described may be changed, eliminated, or combined.

As mentioned above, the example processes of FIGS. 15 and 16A-16B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 15 and 16A-16B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 15 is a flowchart representative of example machine readable instructions 1500 which may be executed to implement the example data allocation management server 104 of FIGS. 1 and/or 2 to manage subscriber groups in a communications network.

The example device messenger 206 of FIG. 2 receives a request from a first subscriber (e.g., a user of the device 108 of FIG. 1) to add a second subscriber (e.g., a user of the device 110 of FIG. 1) to a data sharing group (e.g., the subscriber group 122 of FIG. 1) (block 1502).

The example subscriber group manager 208 looks up a device identifier (e.g., a phone number, an account number, etc.) associated with the second subscriber identified in the request (block 1504). For example, the subscriber group manager 208 may query the subscriber group database 210.

The example subscriber group manager 208 sends a request (via the device messenger 206) for confirmation to be added to the data sharing group of the first subscriber to a device corresponding to the device identifier (block 1506). For example, the request may request consent by the user of the device 110 to be added to the subscriber group 122 associated with the user of the device 108.

If the example subscriber group manager 208 receives assent to the request (block 1508), the example subscriber group manager 208 stores an identifier of the second subscriber (e.g., an account number, a subscriber identifier, etc.) as a member of the data sharing group of the first subscriber (block 1510). For example, if the subscriber group manager 208 receives a message from the device 110 indicating assent and/or if the user of the device 108 has set up a rule via the adjustment rule manager 214 permitting the second subscriber to be added to the subscriber group 122, the example subscriber group manager 208 stores the account number of the second subscriber in associated with the subscriber group 122 of the user of the device 108 in the subscriber group database 210.

After storing the identifier (block 1510), or if the request was not accepted (block 1508), the example instructions 1500 end.

FIGS. 16A and 16B are a flowchart representative of example machine readable instructions 1600 which may be executed to implement the example data allocation management server 104 of FIGS. 1 and/or 2 to allocate bandwidth in the communications network 102 of FIG. 1. The example instructions 1600 may be executed for one subscriber account and/or iterated for multiple subscriber accounts.

The example data usage estimator 202 of FIG. 2 projects the data usage of a first subscriber for a specified time period (block 1602). For example, the data usage estimator 202 may estimate a data usage of the first subscriber within a billing cycle or other time period during which the subscriber may be subject to loss of network access or other penalties for having a network data usage exceed a threshold.

The data usage estimator 202 determines whether the projected data usage is more than a first data allotment for the first subscriber (block 1604). For example, the data usage estimator 202 compares the projected data usage for the first subscriber to a data allotment defined in a subscriber agreement.

The example donor identifier 204 of FIG. 2 identifies a second subscriber who is included in a subscriber group with the first subscriber (block 1606). For example, the donor identifier 204 may request a list of members of the subscriber group 122 from the subscriber group manager 208. At the request of the donor identifier 204, the example data usage estimator 202 projects a data usage for the identified second subscriber for the specified time period (block 1608). The example data usage estimator 202 may project the data usage of the second subscriber using a same or a different technique than in block 1602.

The example donor identifier 204 determines whether the projected data usage for the second subscriber is more than a threshold (block 1610). The threshold for the second subscriber may be set based on a buffered data usage from the data allotment of the second subscriber (e.g., 90% of the data allotment of the second subscriber, the data allotment of the second subscriber less a set data usage amount, etc.).

When the projected data usage for the second subscriber is not more than a threshold (block 1610), the example data allotment adjuster 212 sends (e.g., via the device messenger 206) a message to a device of the first subscriber indicating that the first subscriber's network data usage is projected to exceed the first subscriber's data allotment, and identifying the second subscriber as a candidate for a data allotment transfer (block 1612). For example, the device messenger 206 may send a message to the device 108 of FIG. 1, which displays a notification of a projected data overage and identifies the second subscriber as a potential donor of a data allotment to the first subscriber.

The example data allotment adjuster 212 determines whether a data allotment transfer is requested by the first subscriber to the second subscriber (block 1614). For example, the data allotment adjuster 212 may receive a message (via the device messenger 206) including a request sent by the device 108 and/or identifying the second subscriber.

If the data allotment transfer is not requested by the first subscriber (block 1614), or if the projected data usage for the second subscriber is not more than the threshold (block 1610), the example instructions 1600 end. In some examples, if the projected data usage for the second subscriber is not more than the threshold (block 1610), the donor identifier 204 attempts to identify other subscribers in the subscriber group of the first subscriber that may be candidates to transfer a data allotment to the first subscriber.

Turning to FIG. 16B, when the data allotment transfer is not requested by the first subscriber (block 1614), the example data allotment adjuster 212 requests assent from the second subscriber to transfer a portion of the second subscriber's data allotment to the first subscriber's account (block 1616). For example, the data allotment adjuster 212 may request the adjustment rule manager 214 to determine whether the request for the data allotment from the first subscriber to the second subscriber matches any previously defined rules set by the second subscriber. One or more rules set by the second subscriber via the adjustment rule manager 214 may provide assent to the requested data allotment transfer.

Additionally or alternatively, the example data allotment adjuster 212 may transmit a request to a device of the second subscriber (e.g., via the device messenger 206). In some examples, the request includes an identification of the first subscriber as requesting the data allotment. In some examples, the request identifies a requested amount of the data allotment. If the second subscriber assents, the example data allotment adjuster 212 receives a message indicating the assent and/or identifying a portion of the second subscriber's data allotment offered for transfer.

The example data allotment adjuster 212 determines whether assent has been received from the second subscriber (block 1618). For example, the data allotment adjuster 212 may determine whether a rule and/or a message provides assent to the request to transfer a data allotment. If assent has been received (block 1618), the example data allotment adjuster 212 transfers the portion of the second subscriber's data allotment to the account of the first subscriber (block 1620). For example, the data allotment adjuster 212 may notify the subscriber information server 106 to deduct or credit the second subscriber's account for the portion of the data allotment being transferred, and to add to the data allotment of the first subscriber in the amount of the portion of the data allotment.

The example data allotment adjuster 212 determines whether the transfer transaction is a loan-type transaction (block 1622). If the transfer transaction is a loan-type transaction (block 1622), the example data allotment adjuster 212 notifies the subscriber group manager 208 to store a record of the transaction in the subscriber group database 210 in association with the first and second subscribers to identify the loan-type transaction (block 1624).

After storing the record (block 1624), if assent from the second subscriber is not received (block 1618), or if the transfer transaction is not a loan-type transaction (block 1622), the example instructions 1600 end.

Figure 17:
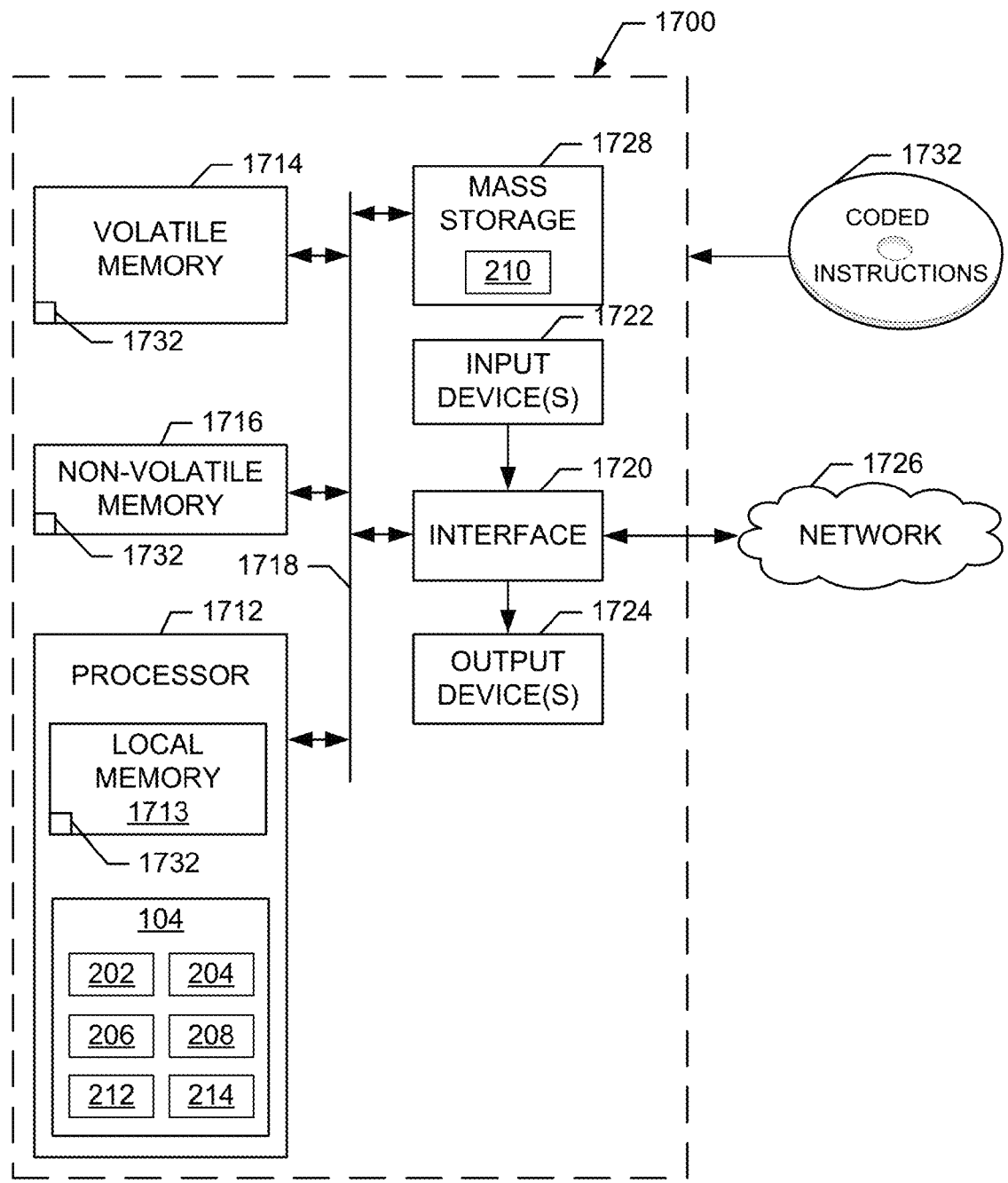
FIG. 17 is a block diagram of an example processor platform capable of executing the instructions of FIGS. 15 and 16A-16B to implement the data allocation management server of FIGS. 1 and/or 2.

FIG. 17 is a block diagram of an example processor platform 1700 capable of executing the instructions of FIGS. 15 and 16A-16B to implement the data allocation management server 104 of FIGS. 1 and/or 2. The processor platform 1700 can be, for example, a server, a personal computer, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer.

The example processor 1712 of FIG. 17 may implement the example data usage estimator 202, the example donor identifier 204, the example device messenger 206, the example subscriber group manager 208, the example subscriber group database 210, the example data allotment adjuster 212, the example adjustment rule manager 214 and/or, more generally, the example data allocation management server 104 of FIGS. 1 and/or 2.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), and/or a PCI express interface.

In the illustrated example, one or more input devices 1722 are connected to the interface circuit 1720. The input device(s) 1722 permit(s) a user to enter data and commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1720 of the illustrated example, thus, typically includes a graphics driver card, a graphics driver chip or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.).

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, RAID systems, and digital versatile disk (DVD) drives.

The example mass storage devices 1728 and/or the example memories 1713, 1714, 1716 may be used to implement the subscriber group database 210 of FIG. 2.

The coded instructions 1732 of FIGS. 15 and 16A-16B may be stored in the mass storage device 1728, in the volatile memory 1714, in the non-volatile memory 1716, and/or on a removable tangible computer readable storage medium such as a CD or DVD.

From the foregoing, it will be appreciated that the above disclosed methods, apparatus and articles of manufacture promote efficient use of communications networks by subscribers. For example, by enabling subscribers to distribute or transfer data allotments, disclosed examples permit subscribers to continue using wireless communications networks when conventional networks would not permit further use for subscribers who exhaust their data allotments, thereby reducing excess capacity in the wireless communications networks and reducing congestion in alternative networks.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to allocate bandwidth between subscribers of a communications network, the method comprising:
projecting, by executing an instruction with a processor of a network service provider, that a first network data usage of a first subscriber of the network service provider will exceed a first data allotment for a first network access account of the first subscriber within a time period;

identifying, by executing an instruction with the processor, a second subscriber of the network service provider who is included in a subscriber group with the first subscriber and projected to have a second network data usage that is below a second data allotment for a second network access account of the second subscriber within that time period, the second subscriber having a different billing address than the first subscriber;

requesting assent from the second subscriber to transfer a portion of the second data allotment to the first subscriber;

in response to receiving the assent from the second subscriber, transferring, by executing an instruction with the processor, the portion of the second data allotment from the second network access account to the first network access account;

sending a first message to a device of the first subscriber, the first message causing the device to indicate that the first network data usage is projected to exceed the first data allotment; and receiving a second message from the device, the requesting of the assent being in response to the second message.

2. The method defined in claim 1, wherein the requesting of the assent includes at least one of 1) sending a message to a device of the second subscriber, the message including an identification of the first subscriber, and 2) comparing the portion of the second data allotment to an assent rule set by the second subscriber.

3. The method defined in claim 1, wherein the first message identifies the second subscriber and is to cause the device to display a notification, the first message to identify the second subscriber as a candidate for requesting a transfer of data allotment based on the identifying of the second subscriber, and the second message identifies the second subscriber.

4. The method defined in claim 1, further including:
storing an identification of the transfer in association with the first subscriber and the second subscriber; and
at a second time after the time period, transferring a third data allotment from the first network access account to the second network access account.

5. The method defined in claim 4, wherein the third data allotment is based on the portion of the second data allotment.

6. The method defined in claim 1, the method further including:
prior to the projecting, receiving a request from at least one of the first subscriber and the second subscriber to have the second subscriber included in the subscriber group; and
storing a subscriber identifier of the second subscriber in association with the first subscriber in the subscriber group.

7. A network service provider apparatus to allocate bandwidth between subscribers of a network service provider, comprising:
a processor; and
a memory including machine readable instructions which, when executed by the processor, cause the processor to perform operations including:
projecting that a first network data usage of a first subscriber of the network service provider will exceed a first data allotment for a first network access account of the first subscriber within a time period;

identifying a second subscriber of the network service provider who is included in a subscriber group with the first subscriber and projected to have a second network data usage that is below a second data allotment for a second network access account of the second subscriber within that time period, the second subscriber having a different billing address than the first subscriber;

requesting assent from the second subscriber to transfer a portion of the second data allotment to the first subscriber;

in response to receiving the assent from the second subscriber, transferring the portion of the second data allotment from the second network access account to the first network access account;

storing an identification of the transfer in association with the first subscriber and the second subscriber; and at a second time after the time period, transferring a third data allotment from the first network access account to the second network access account, the third data allotment being equal to the portion of the second data allotment.

8. The apparatus defined in claim 7, wherein the requesting of the assent includes at least one of 1) sending a message to a device of the second subscriber, the message including an identification of the first subscriber, and 2) comparing the portion of the second data allotment to an assent rule set by the second subscriber.

9. The apparatus defined in claim 7, wherein the operations further include:
sending a first message to a device of the first subscriber, the first message causing the device to indicate that the first network data usage is projected to exceed the first data allotment; and
receiving a second message from the device, the requesting of the assent being in response to the second message.

10. The apparatus defined in claim 9, wherein the first message identifies the second subscriber and is to cause the device to display a notification, the first message to identify the second subscriber as a candidate for requesting a transfer of data allotment based on the identifying of the second subscriber, and the second message identifies the second subscriber.

11. The apparatus defined in claim 7, the operations further including:
prior to the projecting, receiving a request from at least one of the first subscriber and the second subscriber to have the second subscriber included in the subscriber group; and
storing a subscriber identifier of the second subscriber in association with the first subscriber in the subscriber group.

12. A tangible machine readable storage medium comprising machine readable instructions which, when executed, cause a processor of a network service provider to perform operations comprising:
projecting that a first network data usage of a first subscriber of the network service provider will exceed a first data allotment for a first network access account of the first subscriber within a time period;
identifying a second subscriber of the network service provider who is included in a subscriber group with the first subscriber and projected to have a second network data usage that is below a second data allotment for a second network access account of the second subscriber within that time period, the second subscriber having a different billing address than the first subscriber;

requesting assent from the second subscriber to transfer a portion of the second data allotment to the first subscriber;

in response to receiving the assent from the second subscriber, transferring the portion of the second data allotment from the second network access account to the first network access account;

prior to the projecting, receiving a request from at least one of the first subscriber and the second subscriber to have the second subscriber included in the subscriber group; and storing a subscriber identifier of the second subscriber in association with the first subscriber in the subscriber group.

13. The storage medium defined in claim 12, wherein the requesting of the assent includes at least one of 1) sending a message to a device of the second subscriber, the message including an identification of the first subscriber, and 2) comparing the portion of the second data allotment to an assent rule set by the second subscriber.

14. The storage medium defined in claim 12, wherein the operations further include:

sending a first message to a device of the first subscriber, the first message causing the device to indicate that the first network data usage is projected to exceed the first data allotment; and receiving a second message from the device, the requesting of the assent being in response to the second message.

15. The storage medium defined in claim 14, wherein the first message identifies the second subscriber and is to cause the device to display a notification, the message to identify the second subscriber as a candidate for requesting a transfer of data allotment based on the identifying of the second subscriber, and the second message identifies the second subscriber.

16. The storage medium defined in claim 12, wherein the operations further include:

storing an identification of the transfer in association with the first subscriber and the second subscriber; and at a second time after the time period, transferring a third data allotment from the first network access account to the second network access account.

17. The storage medium defined in claim 16, wherein the third data allotment is based on the portion of the second data allotment.

* * * * *